United States Patent [19]

Sata

[11] Patent Number: 5,307,229

[45] Date of Patent: Apr. 26, 1994

[54] MAGNETIC DISK CARTRIDGE AND METHOD OF MANUFACTURING SAME

[75] Inventor: Tosio Sata, Kanagawa, Japan

[73] Assignee: Fuji Photo Film Co., Ltd., Kanagawa, Japan

[21] Appl. No.: 718,469

[22] Filed: Jun. 20, 1991

[30] Foreign Application Priority Data

Jun. 21, 1990 [JP] Japan .................... 2-161437
Jun. 21, 1990 [JP] Japan .................... 2-161438

[51] Int. Cl.$^5$ ................. B29C 45/16; B29C 45/76
[52] U.S. Cl. ................. 360/133; 264/328.12; 264/328.18
[58] Field of Search ............ 264/78, 245, 328.6, 264/328.12, 328.17, 328.18; 360/133

[56] References Cited

U.S. PATENT DOCUMENTS 2,935,763  5/1960  Newman et al. .
4,122,135 10/1978  Valoti et al. .
4,252,764  2/1981  Tokas et al. .
4,983,648  1/1991  Laughner et al. ............ 264/328.18
5,116,547  5/1992  Tsukahara et al. ........... 264/328.18

FOREIGN PATENT DOCUMENTS 0175224  3/1986  European Pat. Off. .
0242158 10/1987  European Pat. Off. .
0352999  1/1990  European Pat. Off. .
2052399  5/1971  Fed. Rep. of Germany .
61-272110 12/1986  Japan ........................ 264/328.18

OTHER PUBLICATIONS

Patent Abstracts of Japan, vol. 11, No. 75 (C-408), Mar. 6, 1987 & JP-A-61 233 041 (Dainichi Seika Kogyo K.K.) Oct. 17, 1986.

Patent Abstracts of Japan, vol. 10, No. 349 (M-538), Nov. 26, 1986 & JP-A-61 149 330 (Sumitomo Bakelite Co., Ltd.) Jul. 8, 1986.

Primary Examiner—Jan H. Silbaugh
Assistant Examiner—A. Y. Ortiz
Attorney, Agent, or Firm—Sughrue, Mion, Zinn, Macpeak & Seas

[57] ABSTRACT

A magnetic disk cartridge which is free from the difficulty associated with the color of the cartridge being nonuniform in the area of weld lines which are likely to be formed in the injection molding of a colored synthetic resin, thus impairing the external appearance of the cartridge, and to a method of manufacturing the magnetic disk cartridge. In accordance with one embodiment of the invention, a magnetic disk cartridge is provided which is formed by injection molding a molten resin prepared by mixing master batch pellets of SAN resin at least 100 gm/10 min in melt flow rate and natural pellets of ABS resin at least 25 gm/10 min in melt flow rate in a ratio of 1:50 to 1:15 by weight. In accordance with another embodiment, a molten resin is injected into a metal mold cavity through a pair of injection gates provided near one end portion of the metal mold cavity, and gas in the cavity is discharged from the metal mold through a degassing arrangement provided at or near a position where a weld line is expected to be formed by the molten resin injected through the pair of injection gates.

2 Claims, 3 Drawing Sheets

MAGNETIC DISK CARTRIDGE AND METHOD OF MANUFACTURING SAME

BACKGROUND OF THE INVENTION

The present invention relates to magnetic disk cartridges, and methods for manufacturing magnetic disk cartridges. More particularly, the invention relates to a magnetic disk cartridge which is free from the difficulty that the color of the cartridge is made nonuniform by weld lines which are liable to be formed in the injection molding of a colored synthetic resin, thus impairing the external appearance of the cartridge, and to a method of manufacturing the magnetic disk cartridge.

Disk cartridges employed for micro floppy disks or optical disks are composed of upper and lower half shells relatively small in thickness which are formed by injection molding acrylonitrile-butadiene-styrene resin (hereinafter referred to as "ABS resin" when applicable) or the like.

The upper and lower half shells are formed by first defining a metal mold cavity corresponding to the configuration of a half shell to be formed by upper and lower halves of a metal mold, and then injecting a molten material into the metal mold cavity thus defined through injection gates such as direct gates and submarine gates. The upper and lower half shells are, in general, improved in external appearance by coloring them. For this purpose, a coloring method such as a colored pellet method or a master batch method is employed. More specifically, the resin material to be injected into the metal mold is colored in accordance with the coloring method in advance, and the resin material thus colored is supplied to the injection molding machine to form colored half shells.

In the case of the colored pellet method, natural pellets (stock resin), pigment, and dispersant are mixed together in advance, and the resultant mixture is kneaded with a single or twin screw extruder to form colored pellets. The colored pellets thus formed are used for the injection molding operation. Thus, the method is advantageous in that the pigment is dispersed with high uniformity; however, it is still disadvantageous in that the coloring cost is high.

The aforementioned master batch method employs a pellet-shaped coloring agent called "master batch" in which a pigment having a desired color is mixed to a high density. In the case a molding operation, the master batch is mixed with natural pellets, and the resultant mixture is diluted so as to be colored. The master batch method is advantageous in that, when compared with the above-described colored pellet method, the coloring cost is low, and the automatic weight and mixing operation can be achieved with ease.

In general, in forming upper and lower half shells which are relatively small in thickness by injection molding, the molten resin is injected into the metal mold through two or four gates. In this case, weld lines are formed in the metal mold where at least two streams of molten resin meet. In other words, when the streams of molten resin meet, because the forward portions of the streams of molten resin have already decreased in temperature, they are not sufficiently joined together, thus forming weld lines. The portion including such weld lines is lowered in mechanical strength, often being cracked or deformed. In addition, the portion is liable to contain air pockets or to contain gas, thus further impairing the external appearance of the product.

Particularly in the case where the resin is colored by the master batch method, the kneading operation is carried out only with the screw of the molding machine, so that the degree of kneading is low. Therefore, in this case, the dispersion and adhesion of the pigment with respect to the natural pellets are lower than in the case where the colored pellet method is employed. Hence, when the pigment is localized, being secondarily condensed by the gas pressure, the portion where weld lines are formed is liable to be low in color uniformity, thus impairing the external appearance. Particularly in the case where ABS resin is employed for the molten resin, the dispersion of pigment is insufficient because of the low adsorption of the butadiene and pigment in the resin. Thus, the product often suffers from color nonuniformity.

SUMMARY OF THE INVENTION

Accordingly, an object of the invention is to eliminate the above-described difficulties accompanying a conventional magnetic disk cartridge. More specifically, an object of the invention is to provide a magnetic disk cartridge which is free from the difficulty that the color is made nonuniform by the weld lines which are liable to be formed in the injection molding of colored ABS resin, thus impairing the external appearance.

The foregoing object of the invention has been achieved by the provision of a magnetic disk cartridge which is formed by injection molding a molten resin which is prepared by mixing master batch pellets in which a pigment having a desired color has been mixed to a high density, and natural pellets while being colored, in which, according to the invention, the magnetic disk cartridge is formed by injection molding a molten resin which is prepared as follows: master batch pellets of SAN resin at least 100 gm/10 min in melt flow rate (hereinafter referred to as "MFR" when applicable), and natural pellets of ABS resin at least 25 gm/10 min in MFR are mixed in a ratio of 1:50 to 1:15 by weight, and made molten.

The above objects of the invention are further met by a magnetic disk cartridge manufacturing method, in which, according to the invention, master batch pellets of SAN resin at least 100 gm/10 min in melt flow rate are prepared in which a pigment having a desired color has been mixed to a high density, natural pellets of ABS resin at least 25 gm/10 min in melt flow rate are prepared, and while the master batch pellets and the natural pellets are being mixed in a ratio of 1:50 to 1:15 by weight, injection molding of the magnetic disk cartridge is carried out.

The term "MFR" as used herein is intended to mean the speed of extrusion of molten thermoplastic resin which is extruded through a die having a predetermined length and a predetermined diameter at a predetermined temperature and under a predetermined pressure. More specifically, the weight of the plastic extruded for ten (10) minutes is calculated as follows (cf. JIS SK 7210):

$$MFR\ (T,M,A) = (600 \times m)/t$$

where
T: Measuring temperature (°C.)
M: Test load (kgf)
A: Operating method A
m: Average value (gm) of the weights of specimens t: Weight measuring specimens sampling time (sec) 600:600 seconds (=10 minutes).

The foregoing object of the invention has further been achieved by the provision of an injection molding method in which a colored molten resin which is prepared by mixing master batch pellets in which a pigment having a desired color has been mixed to a high density, and natural pellets is injected into a metal mold cavity through injection gates which is formed in a metal mold, in which, according to the invention, a molten resin is injected into a metal mold cavity through a pair of injection gates provided near one end portion of the metal mold cavity, and the gas in the metal mold cavity is discharged out of the metal mold through degassing means provided at or near at a position where a weld line is expected to be formed by the molten resin injected through the pair of injection gates, whereby the molten resin is allowed to smoothly flow in the metal mold cavity.

The above-described pigment may be a blue pigment of phthalocyanine series, and the natural pellets may be of ABS or PS resin.

DESCRIPTION OF THE PREFERRED EMBODIMENTS

An example of a magnetic disk cartridge constructed according to the invention will be described in detail.

Figure 1:
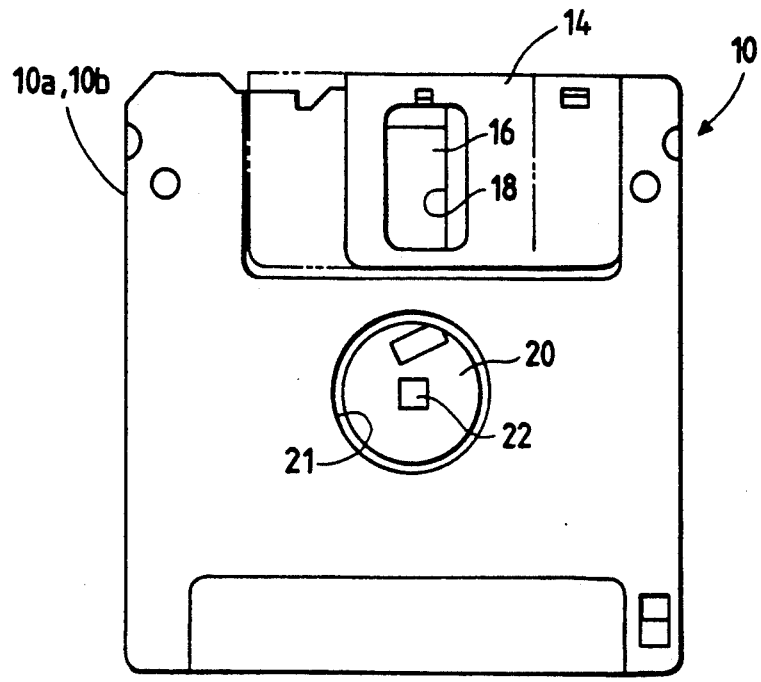
FIG. 1 is a bottom view of an example of a 3.5 inch micro floppy disk constructed in accordance with a preferred embodiment of the invention.

As shown in FIG. 1, a 3.5 inch micro floppy disk cartridge 10 (hereinafter referred merely to as "a disk cartridge" when applicable) is formed by a generally rectangular upper half shell 10a and a lower half shell 10b, which are formed by molding ABS resin or the like, and a magnetic disk 16 held rotatably between the upper and lower half shells 10a and 10b. The magnetic disk 16 is a flexible magnetic recording medium which is produced by forming a uniform magnetic layer on the surface of a disk-shaped high polymer film base. The magnetic disk 16 has a circular opening at the center to which a ring-shaped center core 20 is secured. The center core 20 has a motor shaft inserting hole 22 at the center which is substantially square. The lower half shell 10b of the disk cartridge 10 has an opening 21 at the center through which the motor shaft is inserted into the motor shaft inserting hole 22. The upper and lower half shells 10a and 10b have a magnetic head inserting opening 18 which opens forwardly of the disk cartridge 10. The magnetic head and the head pad are inserted into the magnetic head inserting opening 18 to read data signals from or write data signals to the magnetic disk 16. In order to eliminate the difficulty associated with dust entering the disk cartridge 10 through the magnetic head inserting opening 18 and attaching to the magnetic disk 16, a shutter 14 is slidably mounted on the disk cartridge 10 in such a manner that it slides to open and close the magnetic head inserting opening 18.

Figure 2:
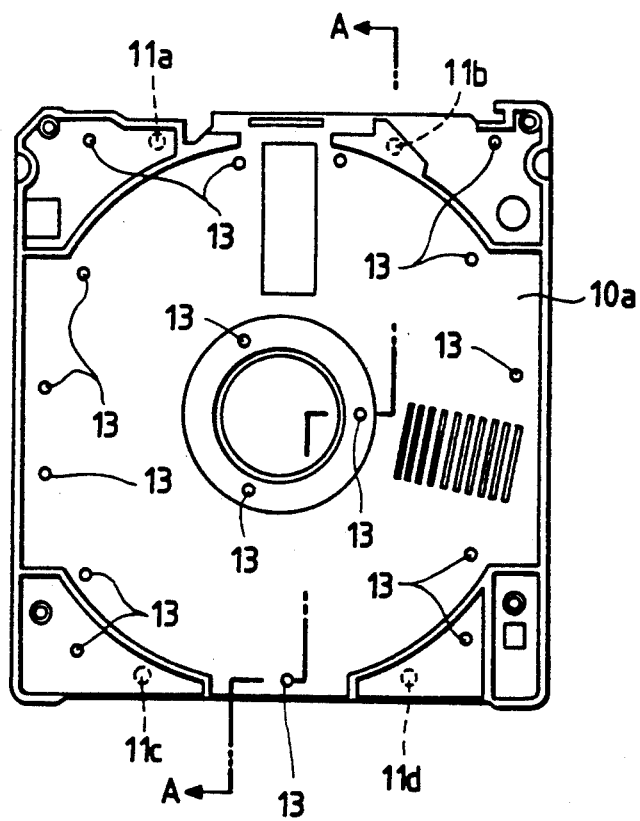
FIG. 2 is a plan view of the upper half shell of the micro floppy disk shown in FIG. 1.
Figure 3:
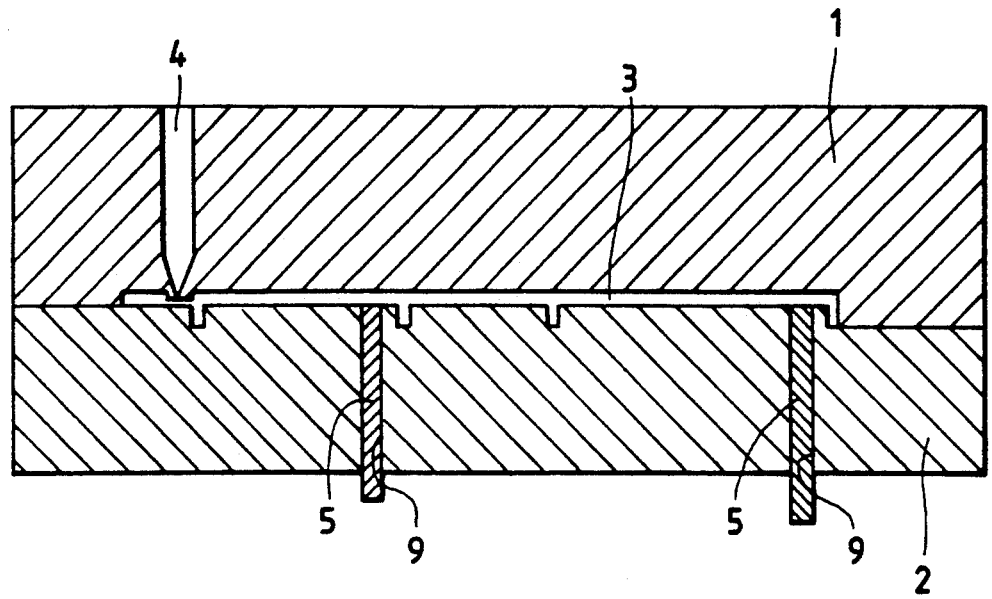
FIG. 3 is a sectional view of a metal mold for forming the upper half shell shown in FIG. 2.

FIG. 3 is a sectional view taken along line A—A in FIG. 2 showing the upper half shell 10a.

The metal mold, as shown in FIG. 3, is composed of a stationary metal mold unit 1 and a movable metal mold unit 2. A metal mold cavity 3 for forming the upper half shell 10a shown in FIG. 2 is formed between the lands of the stationary metal mold unit 1 and the movable metal mold unit 2.

The metal mold cavity 3 is communicated with four direct gates 4 through which molten colored resin is injected. As is seen in FIG. 2, gate traces 11a, 11b, 11c and 11d of the four direct gates 4 are located near the four corners of the rectangular upper half shell 10a. Fifteen or sixteen cylindrical holes 9 are formed in the movable metal mold unit 2, and cylindrical ejection pins 5 are inserted into the cylindrical holes 9. As is seen from ejection pins' traces 13 in FIG. 2, the ejection pins 5 are arranged over the whole surface of the upper half shell 10a; however, it should be noted that all the ejection pins' traces 13 are not shown in FIG. 2.

After the stationary metal mold unit 1 is combined with the movable metal mold unit 2, the molten resin is injected into the metal mold cavity 3 through the direct gates 4, thereby to achieve the injection molding of the upper half shell 10a. In this operation, the ejection pins 5 are moved together with the movable metal mold unit 1 with the end faces of the ejection pins 5 held flush with the metal mold cavity forming surface (or land).

The molten resin is prepared as follows: A master batch pellets of SAN resin containing 25% blue pigment of phthalocyanine series, and natural pellets of ABS resin are mixed in a ratio of 1:30 by weight. The resultant mixture is diluted and colored. The master batch pellets are adjusted so that the MFR is at least 100 gm/10 min at a test temperature of 220° C. and with a test load of 10 kgf, and the natural pellets are adjusted so that the MFR is at least 25 gm/10 min at a test temperature of 220° C. and with a test load of 10 kgf. In order to adjust the fluidity of the master batch pellets and the natural pellets, a method is employed in which the degree of polymerization is changed, and additives such as liquid paraffin is adjusted in quantity.

After the material filled in the metal mold cavity 3 is cooled and solidified, the movable metal mold unit 2 is opened, and the completed molding of the upper half shell 10 is removed from the metal mold. In this operation, the eject pins 5 are pushed towards the stationary metal mold unit 1, thus facilitating the removal of the upper half shell 10a from the mold.

The lower half shell 10b is formed in the same manner.

In the above-described embodiment, the master batch pellets for preparation of the molten resin are made of SAN resin, and contain no butadiene, which is low in adsorption with the above-described pigment, and therefore the problem associated with insufficient dispersion of the pigment in the master batch pellets is eliminated. Furthermore, the ABS resin forming the natural pellets which are kneaded with the master batch pellets is relatively high in MFR (melt flow rate), and therefore has good compatibility with the master batch pellets.

Hence, the disk cartridge which is formed by injection molding of the ABS resin which is colored in accordance with the above-described master batch method is substantially free from the difficulty that weld lines are formed and consequently the color is not uniform. Thus, the disk cartridge of the invention is excellent in external appearance.

The variations in physical properties of the molten resin due to the kneading of the natural pellets of ABS resin and the master batch pellets of SAN resin raise no problem in practical use because the mixing ratio of the two kinds of pellets is large. Additives such as an antistatic agent, an antioxidizing agent and an ultraviolet absorber, dispersing agents, and/or lubricants may be added to the molten resin to the extent that the addition does not adversely affect the function thereof.

The mixing ratio of the master batch pellets to the natural pellets is preferably 1:50 to 1:15 by weight, and more preferably 1:30 to 1:20. That is, if the mixing ratio exceeds 1:50, then the resultant molding is large in density difference, and if it is lower than 1:15, the coloring cost will be greatly increased.

The embodiment has been described with reference to a 3.5 inch micro floppy disk cartridge; however, the invention is not limited thereto or thereby. That is, the technical concept of the invention can be applied to the case where an injection material is injected through injection gates into a metal mold cavity to form a molding relatively small in thickness, as in the injection molding of an optical disk cartridge. That is, the configuration and size of the injection metal mold described above, and the positions of the gates thereof can be freely changed or modified as the case may be.

The magnetic disk cartridge according to the invention is formed by injection molding molten resin which is prepared by mixing master batch pellets of an SAN resin which is at least 100 gm/10 min in MFR (melt flow rate) and natural pellets of ABS resin which is at least 25 gm/10 min in MFR in a ratio of 1:50 to 1:15 by weight and then made molten.

In the above-described embodiment, the master batch pellets for preparation of the molten resin are made of SAN resin and contain no butadiene, which is low in adsorption with problem associated with insufficient the master batch pellets is eliminated. Furthermore, the ABS resin forming the natural pellets which are kneaded with the master batch pellets is relatively high in MFR, and therefore it is high in compatibility with the master batch pellets.

Hence, even in the injection molding of the molten resin containing the ABS resin which is colored in accordance with the master batch method, which is inferior in the dispersion and adhesion of pigment with respect to the natural pellets than the colored pellet method, the resultant magnetic disk cartridge is substantially free from color nonuniformity due to the formation of weld lines; that is, it is excellent in external appearance.

Thus, the injection molding operation can be carried out using the ABS resin colored by the master batch method which is relatively low in cost. Accordingly, a magnetic disk cartridge excellent in external appearance, less in color nonuniformity, and low in manufacturing cost can be provided according to the invention.

Examples of the Invention

In order to better illustrate the effects of the invention, specific examples of the magnetic disk cartridge of the invention will be described.

Master batch pellets 1

Resin materials as listed in the following Table 1 were mixed with a mixer and kneaded with a Banbury mixer. The resultant mixture was flattened and cut into cubic pellets. A twin-screw kneading and extruding machine was used to convert the cubic pellets thus formed into master batch pellets (M/B pellets) S1, S2, S3 and S4 about 3 mm in diameter and about 5 mm in height. The M/B pellets S1, S2, S3 and S4 were adjusted so that they were 90 gm/10 min, 95 gm/10 min, 100 gm/10 min, and 110 gm/10 min in MFR (melt flow rate), respectively

TABLE 1

| Essential components: | |
|---|---|
| SAN resin | 70 parts by weight |
| Blue pigment of phthalocyanine series | 25 parts by weight |
| Zinc stearate | 5 parts by weight |

Master batch pellets 2

Resin materials as listed in the following Table 2 were mixed with a mixer and kneaded with a Banbury mixer. The resultant mixture was flattened and cut into cubic pellets. A twin-screw kneading and extruding machine was used to convert the cubic pellets thus formed into master batch pellets (M/B pellets) A1, A2, A3 and A4 which were about 3 mm in diameter and about 5 mm in height. The M/B pellets A1, A2, A3 and A4 were adjusted so that they were 90 gm/10 min, 95 gm/10 min, 100 gm/10 min, and 110 gm/10 min in MFR (melt flow rate), respectively

TABLE 2

| Essential components: | |
|---|---|
| ABS resin | 70 parts by weight |
| Blue pigment of phthalocyanine series | 25 parts by weight |
| Zinc stearate | 5 parts by weight |

EXAMPLE 1

The above-described M/B pellets S1, S2, S3 and S4 were mixed with ABS resins (natural pellets) B1, B2, B3 and B4 which were 15 gm/10 min, 20 gm/10 min, 25 gm/10 min and 30 gm/10 min, respectively, in mixing ratios of 1:55, 1:50 and 1:45. The resultant mixtures were diluted and colored to form molten resin specimens. For each of the specimens, the half shell forming metal mold shown in FIG. 3 was used to form 200 upper half shells of the 3.5 inch micro floppy disk cartridge by injection molding as illustrated in FIG. 2. The half shells thus formed were visually inspected reflecting light therefrom to determine whether or not they were acceptable in external appearance. The half shells which were determined acceptable in external appearance were further subjected to a visual inspection in which light was transmitted through the cartridges. The results of the visual inspection are as listed in the following Table 3:

TABLE 3

| Specimen No. | M/B Pellets | Natural Pellets | Mixing Ratio | External Appearance | Color Non-uniformity (%) |
| --- | --- | --- | --- | --- | --- |
| 1 | S1 | B1 | 55:1 | O | 20% |
| 2 | (MFR 15 | (MFR 15 | 50:1 | O | 20% |
| 3 | gm/10 min) | gm/10 min) | 45:1 | O | 15% |
| 4 | | B2 | 55:1 | O | 18% |
| 5 | | (MFR 20 | 50:1 | O | 15% |
| 6 | | gm/10 min) | 45:1 | O | 10% |
| 7 | | B3 | 55:1 | O | 10% |
| 8 | | (MFR 15 | 50:1 | O | 10% |
| 9 | | gm/10 min) | 45:1 | O | 5% |
| 10 | | B4 | 55:1 | O | 10% |
| 11 | | (MFR 30 | 50:1 | O | 8% |
| 12 | | gm/10 min) | 45:1 | O | 5% |
| 13 | S2 | B1 | 55:1 | O | 15% |
| 14 | (MFR 95 | | 50:1 | O | 15% |
| 15 | gm/10 min) | | 45:1 | O | 12% |
| 16 | | B2 | 55:1 | O | 10% |
| 17 | | | 50:1 | O | 10% |
| 18 | | | 45:1 | O | 7% |
| 19 | | B3 | 55:1 | O | 8% |
| 20 | | | 50:1 | O | 7% |
| 21 | | | 45:1 | O | 3% |
| 22 | | B4 | 55:1 | O | 7% |
| 23 | | | 50:1 | O | 5% |
| 24 | | | 45:1 | O | 2% |
| 25 | S3 | B1 | 55:1 | O | 10% |
| 26 | (MFR 100 | | 50:1 | O | 7% |
| 27 | gm/10 min) | | 45:1 | O | 6% |
| 28 | | B2 | 55:1 | O | 5% |
| 29 | | | 50:1 | O | 5% |
| 30 | | | 45:1 | O | 2% |
| 31 | | B3 | 55:1 | O | 3% |
| 32 | | | 50:1 | O | 0% |
| 33 | | | 45:1 | O | 0% |
| 34 | | B4 | 55:1 | O | 2% |
| 35 | | | 50:1 | O | 0% |
| 36 | | | 45:1 | O | 0% |
| 37 | S4 | B1 | 55:1 | O | 5% |
| 38 | (MFR 110 | | 50:1 | O | 3% |
| 39 | gm/10 min) | | 45:1 | O | 3% |
| 40 | | B2 | 55:1 | O | 3% |
| 41 | | | 50:1 | O | 2% |
| 42 | | | 45:1 | O | 0% |
| 43 | | B3 | 55:1 | O | 2% |
| 44 | | | 50:1 | O | 0% |
| 45 | | | 45:1 | O | 0% |
| 46 | | B4 | 55:1 | O | 2% |
| 47 | | | 50:1 | O | 0% |
| 48 | | | 45:1 | O | 0% |

In Example 1, the injection conditions were as follows:

| | |
| --- | --- |
| Cylinder temperature | 230° C. |
| Metal mold temperature | 30° C. |
| Injection time | 0.6 sec |
| Injection pressure | 135 kg/cm² (hydraulic pressure) |

COMPARISON EXAMPLE 1

Under the same conditions as those in the Example 1, except that instead of the M/B pellets S1, S2, S3 and S4, the M/B pellets A1, A2, A3 and A4 were employed, for each of the specimens 200 upper half shells of a 3.5 inch micro floppy disk cartridge were produced. The half shells thus produced were visually inspected by reflecting light therefrom. The results of the visual inspection are as indicated in the following Table 4:

TABLE 4

| Specimen No. | M/B Pellets | Natural Pellets | Mixing Ratio | External Appearance | Color Non-uniformity (%) |
| --- | --- | --- | --- | --- | --- |
| 49 | A1 | B1 | 55:1 | X | — |
| 50 | (MFR 15 | (MFR 15 | 50:1 | X | — |
| 51 | gm/10 min) | gm/10 min) | 45:1 | X | — |
| 52 | | B2 | 55:1 | X | — |
| 53 | | (MFR 20 | 50:1 | X | — |
| 54 | | gm/10 min) | 45:1 | X | — |
| 55 | | B3 | 55:1 | X | — |
| 56 | | (MFR 25 | 50:1 | X | — |
| 57 | | gm/10 min) | 45:1 | X | — |
| 58 | | B4 | 55:1 | X | — |
| 59 | | (MFR 30 | 50:1 | X | — |
| 60 | | gm/10 min) | 45:1 | X | — |
| 61 | A2 | B1 | 55:1 | X | — |
| 62 | (MFR 95 | | 50:1 | X | — |
| 63 | gm/10 min) | | 45:1 | X | — |
| 64 | | B2 | 55:1 | X | — |
| 65 | | | 50:1 | X | — |
| 66 | | | 45:1 | X | — |
| 67 | | B3 | 55:1 | X | — |
| 68 | | | 50:1 | X | — |
| 69 | | | 45:1 | X | — |
| 70 | | B4 | 55:1 | X | — |
| 71 | | | 50:1 | X | — |
| 72 | | | 45:1 | X | — |
| 73 | A3 | B1 | 55:1 | X | — |
| 74 | (MFR 100 | | 50:1 | X | — |
| 75 | gm/10 min) | | 45:1 | X | — |
| 76 | | B2 | 55:1 | X | — |
| 77 | | | 50:1 | X | — |
| 78 | | | 45:1 | X | — |
| 79 | | B3 | 55:1 | X | — |
| 80 | | | 50:1 | X | — |
| 81 | | | 45:1 | X | — |
| 82 | | B4 | 55:1 | X | — |
| 83 | | | 50:1 | X | — |
| 84 | | | 45:1 | X | — |
| 85 | A4 | B1 | 55:1 | X | — |
| 86 | (MFR 110 | | 50:1 | X | — |
| 87 | gm/10 min) | | 45:1 | X | — |
| 88 | | B2 | 55:1 | X | — |
| 89 | | | 50:1 | X | — |
| 90 | | | 45:1 | X | — |
| 91 | | B3 | 55:1 | X | — |
| 92 | | | 50:1 | X | — |
| 93 | | | 45:1 | X | — |
| 94 | | B4 | 55:1 | X | — |
| 95 | | | 50:1 | X | — |
| 96 | | | 45:1 | X | — |

In Tables 3 and 4, in the column "External Appearance," the mark O indicates that the external appearance is acceptable (all of the 200 samples (half shells) are acceptable), while the mark X indicates that the external appearance is not acceptable (the mark X being employed even when only one of the 200 samples was unacceptable).

As is apparent from the above description, the external appearance inspections performed by using light reflected from the magnetic disk cartridges revealed the fact that the magnetic disk cartridges formed by using the M/B pellets of SAN resin were superior in external appearance to those formed by using the M/B pellets of ABS resin. Also, it has been found that where the SAN resin forming the M/B pellets is made at least 100 gm/10 min in MFR while the ABS resin forming the natural pellets is made at least 25 gm/10 min in MFR, and the mixing ratio of the M/S pellets and the natural pellets is set to 1:50 or less, the resultant magnetic disk cartridges are acceptable in external appearance, being free from color non-uniformity.

A further embodiment of an injection molding method according to this invention will be described in detail with reference to FIGS. 4 and 5 of the attached drawings.

Figure 4:
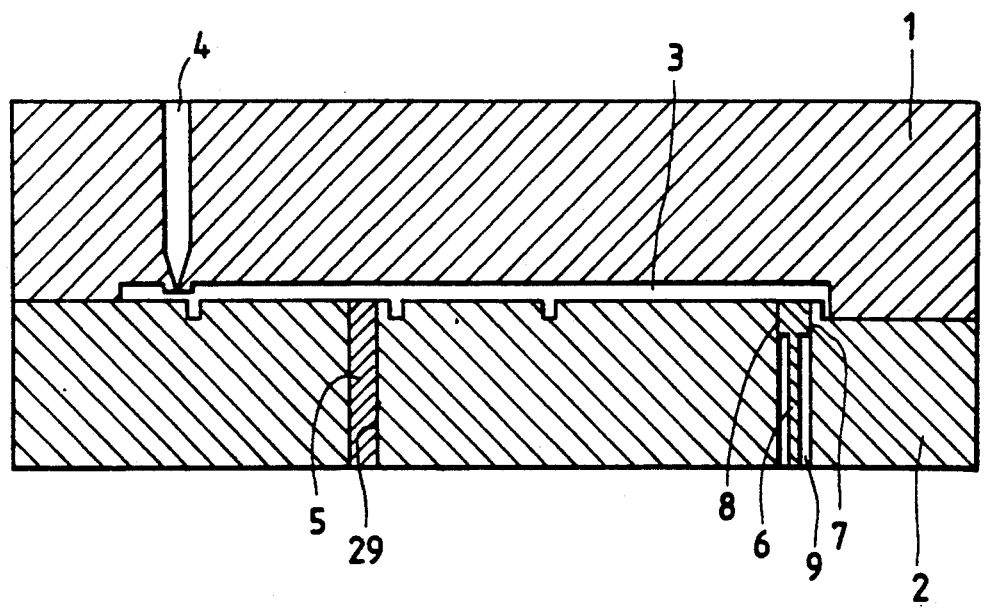
FIG. 4 is a sectional view of a metal mold for forming a 3.5 inch micro floppy disk's half-shell showing a further embodiment of an injection molding method according to the invention.
Figure 5:
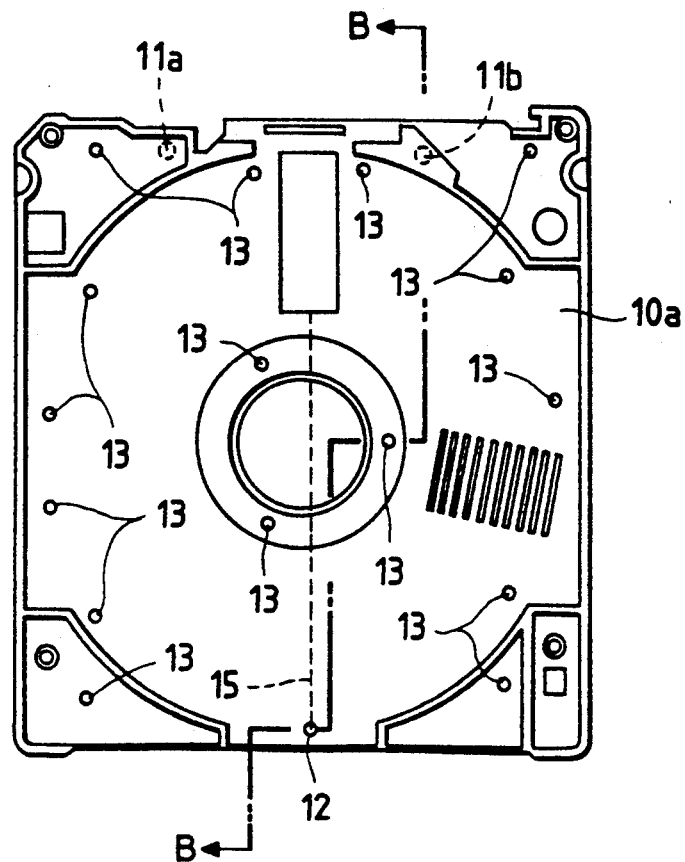
FIG. 5 is a plan view showing an upper half shell formed according to an injection molding method of the invention.

FIG. 4 is a sectional view of a half-shell-forming metal mold for forming a 3.5 inch micro floppy disk cartridge formed according to the injection molding method of this embodiment of the invention, corresponding to a sectional view taken along line B—B in FIG. 5 showing an upper half shell. Like reference numerals appearing in FIGS. 1–5 represent similar elements.

The metal mold cavity 3 of the mold depicted in FIG. 4 is communicated with a pair of direct gates 4 through which molten colored resin is injected. As is seen from gate traces 11a and 11b in FIG. 5, the two direct gates 4 are located near the two corners of the front end portion of the rectangular upper half shell 10a, respectively.

Fifteen or sixteen cylindrical holes 29 are formed in the movable metal mold unit 2, and cylindrical ejection pins 5 are inserted into the cylindrical holes 9. As is seen from ejection pins traces 13 in FIG. 5, the ejection pins 5 are arranged over the whole surface of the upper half shell 10a; however, it should be noted that all the ejection pins traces 13 are not shown in FIG. 5.

In accordance with this embodiment of the invention, a degassing arrangement is provided on the weld line 15 (indicated by the broken line in FIG. 2) formed by the molten resin injected through the above-described pair of direct gates 4, and near the edge of the rear end portion of the upper half shell 10a opposite the front end portion where the direct gates 4 are provided. The degassing arrangement includes a cylindrical hole 9 formed in the movable metal mold unit 2 and an ejection pin 6 which is inserted into the hole 9 and defines a part of the metal mold cavity 3. The pin 6 is inserted into the hole in such a manner that a small gap 8 is formed between the inner wall of the cylindrical hole 9 and the cylindrical end portion of the pin 6 which is located on the metal mold cavity side. The width of the small gap 8 is appropriately determined according to the pressure of ejecting the molten resin and the composition of the resin. In order to prevent the resultant product from being adversely affected by the small gap 8, it is preferable to set the width of the small gap 8 to 0.01 to 0.02 mm. An ejection trace 12 shown in FIG. 2 is formed by the ejection pin 6. The above-described hole 9 is communicated with the outside of the movable metal mold unit 2.

After the stationary metal mold unit 1 is combined with the movable metal mold unit 2, the molten resin is injected into the metal mold cavity 3 through the direct gates 4 so as to achieve the injection molding of the upper half shell 10a. In this operation, the ejection pin 6 is moved together with the movable metal mold unit 2 with the end face of the cylindrical end portion 7 held flush with the metal mold cavity forming surface (or land). It goes without saying that the ordinary ejection pins 5 are moved in the same manner.

When the material filled in the metal mold cavity 3 has been cool and solidified, the movable metal mold unit 2 is opened to remove the molding, namely, the upper half shell 10a from the metal mold. In this operation, the ejection pins 5 and 6 push the molding 10a towards the stationary metal mold unit 1, thus facilitating the removal of the molding 10a.

In the above-described embodiment, the degassing arrangement, inclusive of the small gap between the larger diameter portion 7 of the ejection pin 6 and the inner wall of the hole 9, is provided at the position where the welding line is expected to be formed by the streams of molten resin injected into the metal mold through the pair of direct gates 4, Hence, the gas which is produced when part of the molten resin is decomposed by the shearing heat and the air in the metal mold cavity 3 are discharged from the metal mold through the gap while being pushed out by the molten resin. The small gap 8 is a cylindrical pipe-shaped gap whose thickness is selected so that the molten resin is not allowed to pass therethrough, that is, only the above-described gas is permitted to pass through the gap.

Thus, the gas is discharged out of the metal mold through the gap 8 between the ejection pin 6 and the hole 9 without obstructing the flow of molten gas in the metal mold cavity.

Thus, even in the injection molding of a molten resin colored by the master batch method, which is inferior in the dispersion and adhesion of pigment with respect to natural pellets to the colored pellet method, the difficulty is eliminated that the pigment mixed in the molten resin is localized due to secondary condensation by the gas pressure, thus making the product nonuniform in color.

In the above-described embodiment, the degassing arrangement provided at the position where the streams of molten resin injected through the pair of direct gates 4 meet to form a weld line 15 is defined by the hole 9 formed in the movable metal mold unit 2 and the ejection pin 6 inserted into the hole 9; however, the invention is not limited thereto or thereby.

A still further embodiment of the invention will now be described which employs another example of a degassing arrangement.

Figure 6:
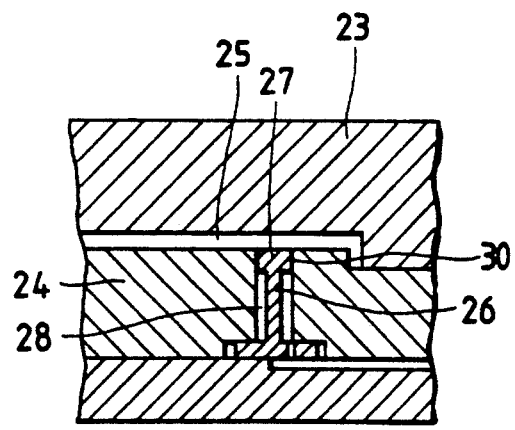
FIG. 6 is a sectional view of a metal mold for forming a part of a 3.5 inch micro floppy disk's half shell showing another embodiment of the injection molding method according to the invention.

FIG. 6 is a sectional view showing a part of a metal mold for forming the upper half shell 10a of a disk cartridge 10.

The metal mold has a stationary metal mold unit 23 and a movable metal mold unit 24 which defines a metal mold cavity 25 to form the upper half shell 10a. The metal mold cavity 25 is communicated with a pair of direct gates (not shown) provided for the stationary metal mold unit 23. Similarly as in the above-described first embodiment, the pair of direct gates are provided near the two corners of the front end portion of the upper half shell 10a.

A degassing arrangement is provided on the weld line 15 (indicated by the broken line in FIG. 2) formed by the molten resin injected through the above-described pair of direct gates and near the edge of the rear end portion of the upper half shell 10a opposite the front end portion where the direct gates are provided. The degassing arrangement of this embodiment includes a cylindrical hole 28 formed in the movable metal mold unit 2, and an insert pin 26 which is inserted into the hole 28. The metal mold cavity 25 is communicated through the hole 28 with the outside of the metal mold. The insert pin 26 has a cylindrical end portion 27 on the metal mold cavity side, and a small gap 30 is formed between the cylindrical end portion 27 and the inner wall of the hole 28. The width of the gap 30 is preferably 0.01 to 0.02 mm at the maximum, similarly as in the above-described first embodiment.

Hence, the gas which, during injection of the molten resin into the metal mold cavity through the direct gates, is produced when part of the molten resin is decomposed by shearing heat, and the air in the metal mold cavity 3 are discharged from the metal mold through the degassing arrangement, namely, the small gap 30 between the cylindrical end portion 27 of the insert pin 26 and the inner wall of the hole 28, while being pushed out by the molten metal.

The preferred embodiments of the invention have been described with reference to the 3.5 inch micro floppy disk cartridge; however, the invention is not limited thereto or thereby. That is, it goes without saying that the technical concept of the invention can be applied to the case where an injection material is injected through injection gates into a metal mold cavity to form a molding relatively small in thickness. That is, the configuration and size of the above-described injection gates and degassing arrangement can be changed or modified in configuration, size and position in compliance with injection moldings to be formed. In addition, in the above-described embodiments, the molten resin is ABS resin; however, the invention is not limited thereto or thereby. For instance, other resins such as PS resin may be employed.

As was described above, in the injection molding method of the latter embodiments of the invention, molten resin is injected into the metal mold cavity through the two injection gates provided near the one end portion of the metal cavity, and the gas in the metal mold cavity is discharged through the degassing arrangement provided at or near at the position where the weld line is expected to be formed by the molten resin ejected through the two injection gates, whereby the molten resin in the metal mold cavity is improved in fluidity.

That is, the air in the metal mold cavity and the gas produced when part of the molten resin ejected through the injection gates is decomposed by the shearing heat are discharged through the degassing arrangement without obstructing the streams of molten resin while being pushed out by the molten resin.

Hence, even in the injection molding of a molten resin colored by the master batch method inferior in the dispersion and adhesion of pigment with respect to natural pellets to the colored pellet method, the difficulty is eliminated that the pigment mixed in the molten resin is localized due to secondary condensation by the gas pressure, thus making the product nonuniform in color.

Thus, according to the invention, injection molding of the molten resin can be performed with resin colored by the master batch method, which is relatively low in coloring coat. That is, injection moldings excellent in external appearance and substantially uniform in color can be produced at relatively low manufacturing cost.

EXAMPLE 2

In order to clarify the effects of the above embodiments of the invention, a specific example thereof will be described.

The upper half shell of a 3.5 inch micro floppy disk cartridge as shown in FIG. 1 was formed by molding ABS resin in accordance with the injection molding method acoording to the invention in which the degassing arrangement was provided at the position where the weld line was expected to be formed. Similarly, the upper half shell was formed by molding the ABS resin in accordance with the conventional injection molding method in which no degassing means is provided. The upper half shells thus formed were visually inspected by using light reflected therefrom to determine whether or not they are acceptable in external appearance, and by using light passed through them to determined whether or not they are acceptable in color uniformity.

The ABS resin was a colored resin which was prepared by mixing master batch pellets containing 25% blue pigment of phthalocyanine series, and natural pellets and by diluting the resultant mixture.

The injection molding conditions were as follows:

| | |
|---|---|
| Cylinder temperatures | 230° C. |
| Metal mold temperature | 30° C. |
| Injection time | 0.6 sec |
| Injection pressure | 135 kg/cm$^2$ (hydraulic pressure) |
| Gap width | 0.01 mm |

In the above-described Example, the upper half shells formed according to the method of the invention and according to the conventional method were substantially equal in external appearance when inspected by reflecting light therefrom; however, they were definitely different in color uniformity when inspected with by passing light therethrough. More specifically, the percentage of occurrence of color nonuniformity with the upper half shells formed according to the method of the invention is less than half of that with the upper half shells formed according to the conventional method.

What is claimed is:

1. A magnetic disk cartridge which is formed by injection molding a molten resin prepared by mixing master batch pellets in which a pigment having a desired color has been mixed, with natural pellets, the improvement wherein said magnetic disk cartridge is formed by injection molding a molten resin prepared by mixing master batch pellets of SAN resin at least 100 gm/10 min in melt flow rate and natural pellets of ABS resin at least 25 gm/10 min in melt flow rate in a ratio in a range of 1:50 to 1:15 by weight.

2. The magnetic disk cartridge as claimed in claim 1, wherein said ratio is in a range of 1:30 to 1:20.

* * * * *